United States Patent
Su et al.

(10) Patent No.: US 11,403,346 B2
(45) Date of Patent: Aug. 2, 2022

(54) METHOD AND DEVICE FOR SEARCHING FOR INFORMATION IN APPLICATIONS

(71) Applicant: SHANGHAI ZHANGMEN SCIENCE AND TECHNOLOGY CO., LTD., Shanghai (CN)

(72) Inventors: Yong Su, Shanghai (CN); Fei Wang, Shanghai (CN)

(73) Assignee: SHANGHAI ZHANGMEN SCIENCE AND TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/079,506

(22) Filed: Oct. 25, 2020

(65) Prior Publication Data
US 2021/0042355 A1 Feb. 11, 2021

Related U.S. Application Data

(63) Continuation of application No. PCT/CN2018/125604, filed on Dec. 29, 2018.

(30) Foreign Application Priority Data

Apr. 26, 2018 (CN) .......................... 201810382710.3

(51) Int. Cl.
*G06F 16/904* (2019.01)
*G06F 16/903* (2019.01)
(Continued)

(52) U.S. Cl.
CPC ........ *G06F 16/904* (2019.01); *G06F 16/9035* (2019.01); *G06F 16/9038* (2019.01); *G06F 16/90335* (2019.01); *H04L 67/561* (2022.05)

(58) Field of Classification Search
None
See application file for complete search history.

(56) References Cited

U.S. PATENT DOCUMENTS

| | | | |
|---|---|---|---|
| 9,558,233 B1 * | 1/2017 | Kim | ..................... G06F 16/951 |
| 2013/0086052 A1 | 4/2013 | Zhang et al. | |

(Continued)

FOREIGN PATENT DOCUMENTS

| | | |
|---|---|---|
| CN | 103078999 A | 5/2013 |
| CN | 103902720 A | 7/2014 |

(Continued)

OTHER PUBLICATIONS

Gong Long, Mobile terminal application program search method, mobile terminal application program search system and mobile terminal, Mar. 29, 2012 (Year: 2012).*

*Primary Examiner* — Kris E Mackes
*Assistant Examiner* — Soheila (Gina) Davanlou
(74) *Attorney, Agent, or Firm* — Kilpatrick Townsend & Stockton, LLP

(57) ABSTRACT

A method and device for searching for information in applications. The method comprises: determining at least one target application carrying declaration information, wherein the declaration information comprises search interface information for searching the target application (S11); sending a search keyword from a user to the target application via the search interface information for the target application (S12); receiving search result information determined by the target application according to the search keyword, wherein the search result information comprises the search keyword and page paths of target pages (S13); and generating a search display list according to the search result information. Thus search results from different applications can be summarized, and information isolation among applications can be broken. Information in applications can be obtained via the search interfaces, which can realize real-time search and enrich contents of search.

11 Claims, 1 Drawing Sheet

Figure 1:
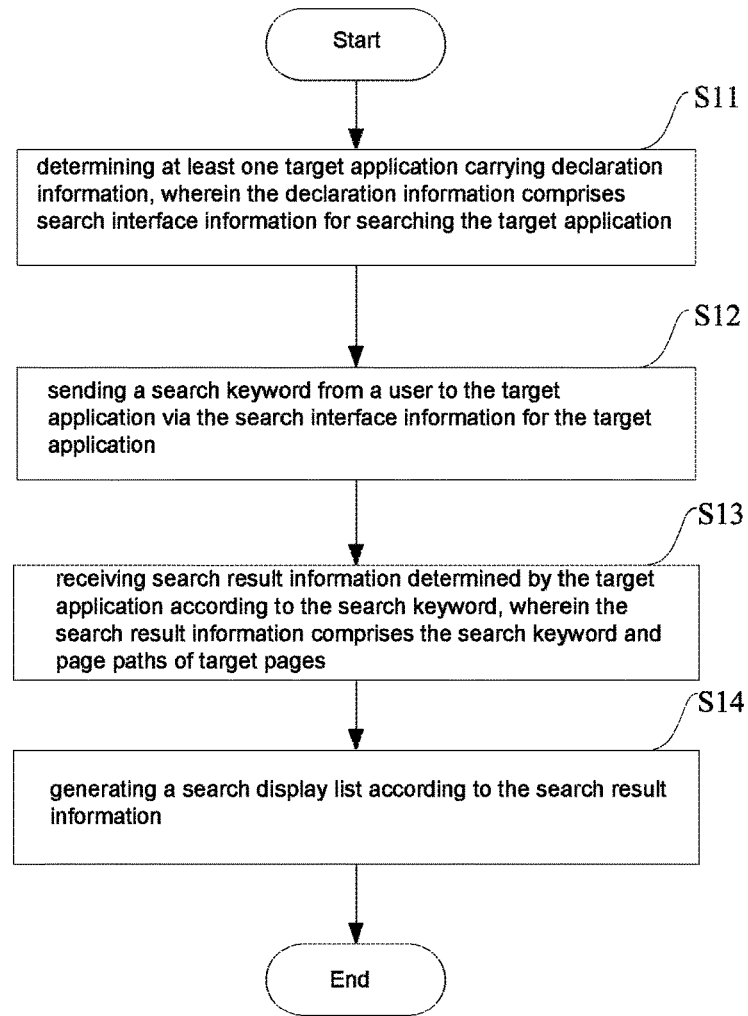

(51) Int. Cl.
*G06F 16/9038* (2019.01)
*G06F 16/9035* (2019.01)
*H04L 67/561* (2022.01)

(56) References Cited

U.S. PATENT DOCUMENTS

2016/0342452 A1* 11/2016 Wang .................. G06F 11/2205
2017/0039248 A1*  2/2017 Morris ................ G06F 16/9535
2017/0357688 A1* 12/2017 Hornkvist ............. G06F 16/148
2020/0371648 A1* 11/2020 Huang ................ G06F 3/04817

FOREIGN PATENT DOCUMENTS

| | | |
|---|---|---|
| CN | 104111979 A | 10/2014 |
| CN | 105095407 A | 11/2015 |
| CN | 105095427 A | 11/2015 |
| CN | 106383871 A | 2/2017 |
| CN | 107330019 A | 11/2017 |
| CN | 108549569 A | 9/2018 |

* cited by examiner

METHOD AND DEVICE FOR SEARCHING FOR INFORMATION IN APPLICATIONS

CROSS REFERENCE TO THE RELATED APPLICATION

This application is the continuation application of International Application No. PCT/CN2018/125604, filed on Dec. 29, 2018, which is based upon and claims priority to Chinese Patent Application No. 201810382710.3, filed on Apr. 26, 2018, the entire contents of which are incorporated herein by reference.

FIELD

The present application relates to computers, more specifically relates to a method and a device for searching for information in applications.

BACKGROUND

With increasing activities of people on the Internet and vigorous development of Internet technology, the number of search engines arise to provide search services for netizens. In the Internet era of personal computers (PCs), webpages (Webs) are mainly searched, and search services are provided by crawling Web contents with Web crawling technology. While in the mobile Internet era, page contents from mobile applications (APPs) are mainly searched. However, each of the APPs is isolated from each other, which forms isolated islands of information, and causes the traditional crawling search technology unusable.

SUMMARY

One objective of the present application is to provide a method and device for searching for information in applications, which can solve problems of information isolation among applications and inability to provide users with page contents information from multiple applications in the prior art.

According to an aspect of the application, it is provided a method for searching for information in applications. The method comprises:

determining at least one target application carrying declaration information, wherein the declaration information comprises search interface information for searching the target application;

sending a search keyword from a user to the target application via the search interface information for the target application;

receiving search result information determined by the target application according to the search keyword, wherein the search result information comprises the search keyword and page paths of target pages; and generating a search display list according to the search result information.

Further, the search display list comprises any combination of one or more of the search keyword, source application information of the target pages, summary information corresponding to the search keyword, and page paths of the target pages.

Further, generating a search display list according to the search result information comprises:

ranking search results according to a preset rule to obtain the search display list, where any combination of one or more of the search keyword, source application information, summary information corresponding to the search keyword and a page path of a target page, which correspond to each of the target pages, are sequentially displayed.

Further, determining at least one target application carrying the declaration information comprises at least one of:

determining at least one target application carrying the declaration information from a list of installed applications of a user equipment;

obtaining, from a network device, a list of applications carrying declaration information, to select, from the list of applications, one or more target applications whose types are the same as those of the applications in the list of installed applications of the user equipment; and obtaining a list of historically installed applications of the user equipment, to determine at least one target application carrying the declaration information from the list of historically installed applications.

Further, ranking the search results according to the preset rule comprises:

ranking the search results based on historical parameter information corresponding to the target pages, wherein the historical parameter information comprises installation time of the source applications of the target pages, information on the number of clicks on the target pages by the user, and dwell time on the target pages by the user.

Further, ranking the search results based on the historical parameter information corresponding to the target pages comprises:

determining a weight value for each of the target pages based on the historical parameter information corresponding to the target page and weight information corresponding to parameters in the historical parameter information;

ranking the search results according to the weight value for each of the target pages.

Further, ranking the search results based on the historical parameter information corresponding to the target pages comprises:

determining a weight value for each of the target pages based on the historical parameter information corresponding to the target page.

Further, determining the weight value for each of the target pages based on the historical parameter information corresponding to the target page comprises:

ranking the target pages according to the installation time of the source applications of the target pages to obtain rank information; and grouping the target pages according to a preset time unit and the installation time, and updating the weight value for each of the target pages according to the number of groups and the rank information.

Further, the method comprises:

updating the weight values for the target pages according to the information on the number of clicks on the target pages by the user.

Further, the method comprises:

updating the weight values for the target pages according to a preset length of time and the dwell time on the target pages by the user.

Further, after the search keyword and the source application information corresponding to each of the target pages from the search results are sequentially displayed, the method comprises:

jumping to a source application corresponding to a target page according to the user's selection operation and the page path, to display page contents information of the target page in the source application.

According to another aspect of the present application, it is also provided a computer readable medium having computer readable instructions stored thereon, the computer readable instructions being executable by a processor to implement the above mentioned method for searching for information in applications.

According to yet another aspect of the application, it is also provided a device for searching for information in applications. The device comprises:

one or more processors; and a memory storing computer readable instructions, wherein the computer readable instructions, when executed, cause the processor to perform the operations of the above mentioned methods.

Compared with the prior art, the present application determines at least one target application carrying declaration information, wherein the declaration information comprises search interface information for searching the target application; sends a search keyword from a user to the target application via the search interface information for the target application; receives search result information determined by the target application according to the search keyword, wherein the search result information comprises the search keyword and page paths of target pages; generates a search display list according to the search result information. Thus search results from different applications can be summarized, more comprehensive and richer search results can be provided to users, and information isolation among applications can be broken, which prevents users from repeating search operations for the same search request in different applications. Information in applications can be obtained via the search interfaces, which can realize real-time search and enrich contents of search.

DESCRIPTIONS OF THE DRAWINGS

Figure 2:
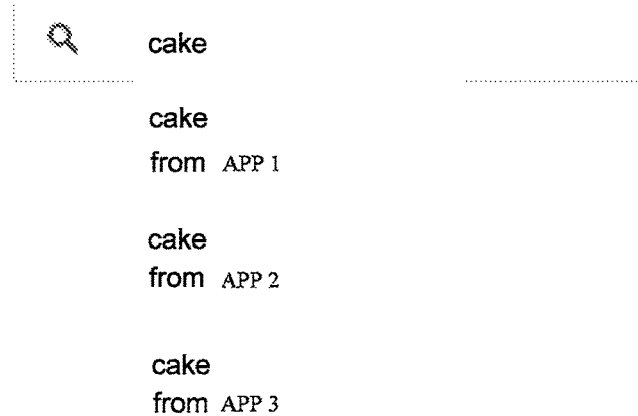

Other features, objects, and advantages of the present application will become more apparent by reading the detailed description of non-limiting embodiments with reference to the following drawings:

FIG. 1 shows a schematic flowchart of a method for searching for information in applications provided according to one aspect of the present application; and FIG. 2 shows a schematic diagram of an interface display of search results in an embodiment of the present application.

The identical or similar reference numerals in the drawings represent the identical or similar components.

DETAILED EMBODIMENTS

The application is further described in detail below with reference to the accompanying drawings.

In a typical configuration of the present application, a terminal, a device of a service network and a trusted party all include one or more processors (CPUs), an input/output interface, a network interface and a memory.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and a carrier.

FIG. 1 shows a schematic flowchart of a method for searching for information in applications provided according to one aspect of the present application. The method comprises steps S11 to S14. At step S11, at least one target application carrying declaration information is determined, wherein the declaration information comprises search interface information for searching the target application. At step S12, a search keyword from a user is sent to the target application via the search interface information for the target application. At step S13, search result information determined by the target application according to the search keyword is received, wherein the search result information comprises the search keyword and page paths of target pages. At Step S14, a search display list is generated according to the search result information. Thus search results from different applications can be summarized, more comprehensive and richer search results can be provided to users, and information isolation among applications can be broken, which prevents users from repeating search operations for the same search request in different applications. Information in the applications can be obtained via the search interfaces, which can realize real-time search and enrich contents of search.

Specifically, at step S11, at least one target application carrying declaration information is determined, wherein the declaration information comprises search interface information for searching the target application. Here, steps S11 to S14 described in the present application may be executed on a mobile search engine, to search for contents in applications in a mobile operating system. When obtaining information in an application, the information may be obtained through a search interface for the applications. The search interface may be implemented through inter-process communication. When an application declares itself to be searchable, the application can be located according to the declaration information, and the application with declaration that can be located may be used as a target application, to obtain desired contents of search from the target application. In an embodiment of the present application, for example, in an Android system, the inter-process communication may include ContentProvider, Activity (Page), Service, BoardcastReceiver and socket. When an application declares itself to be searchable, the declaration information it carries comprises search interface information, wherein the search interface information comprises the way that inter-process communication is implemented, such as a search interface implemented with Activity or socket.

Next, at step S12, a search keyword from a user is sent to the at least one target application via the search interface information for the target application. Here, the search keyword from the user is obtained, and the search keyword is sent to the target application, passed to the target application through the search interface, so that the target application performs matching of the search keyword and looks for corresponding page contents information according to the search keyword. Thus, at step S13, search result information determined by the target application according to the search keyword is received, wherein the search result information comprises the search keyword and page paths of target pages. Here, each of the target applications is to match contents of search result according to the passed search keyword, so that the search engine obtains the contents of search result returned by the target application, wherein the contents of search result may comprise the search keyword and page paths of target pages. For example, the contents may be presented as follows:

matching result 1: a corresponding page path (Activity Address)

matching result 2: a corresponding page path (Activity Address).

Of course, the above mentioned way of presenting the contents is merely an example. Other existing ways of presenting the contents of search results or those that may appear in the future fall within the protection scope of the present application and are incorporated herein by reference if applicable to the present application.

At Step S14, a search display list is generated according to the search result information. Here, the mobile search engine collects search results returned by each of the target applications, and generates a search display list, wherein the search display list may store result information in form of a dictionary. In an embodiment of the present application, the search display list comprises any combination of one or more of the search keyword, source application information of the target pages, summary information corresponding to the search keyword, and the page paths of the target pages. Here, what is in the search display list may be the keyword and paths of the target pages, wherein the paths of the target pages are links to the pages, which is convenient for a user to click to view the corresponding page contents. Of course, the keyword, page paths of target pages and source application information may also be displayed, to facilitate a user to know sources of search results and select corresponding search results according to the sources. The search display list may also display summary information associated with the search keyword and contents of the target pages, with the search keyword presented in form of an index. A variety of display interfaces may be provided for a user through layouts of display information of the search display list, and thus the user's search need is satisfied. In an embodiment of the present application, a ternary dictionary may be formed according to the collected search results, wherein the dictionary is determined by the search keyword, a source application and a page path of the target page, such as:

APP 1: matching result 1: a corresponding page path (Activity Address)

APP 1: matching result 2: a corresponding page path (Activity Address)

APP 2: matching result 1: a corresponding page path (Activity Address)

APP 3: matching result 1: a corresponding page path (Activity Address).

When a list of search results is generated, search result information may be ranked to generate a ranked list. Specifically, the search results may be ranked according to a preset rule, to obtain the search display list, where any combination of one or more of the search keyword, source application information, summary information corresponding to the search keyword and a page path of a target page, which correspond to each of the target pages, are sequentially displayed. In turn, it may jump to the detailed page contents corresponding to the summary information according to the user's selection operation, or jump to the source application corresponding to the target page according to the page path, to display the page contents information from the target page in the source application. In an embodiment of the present application, the search results may be ranked according to a preset rule, and the search keyword and source application information corresponding to each of the pages are sequentially displayed. For example, ranked search results with regard to a search keyword of "cake" may include cake-related pages from APP 1, APP 2, and APP 3 sequentially. As shown in FIG. 2, it will jump to a corresponding APP interface according to the user's operation of selecting some search result and the corresponding page path. For example, the user clicks the search result from APP 1, it may jump to an application interface for APP 1, to facilitate the user to directly perform operations such as placing an order, making an appointment, etc. in APP 1.

In one embodiment, when ranking the search results according to the preset rule, the search results may be ranked based on historical parameter information corresponding to the target pages, wherein the historical parameter information comprises installation time of the source applications of the target pages, information on the number of clicks on the target pages by the user, and dwell time on the target pages by the user. Here, the search results are ranked comprehensively based on installation time of an application, the number of clicks by a user, and dwell time on pages of search results, which is closer to user's inclination of choice and thus improves user experience.

Specifically, a weight value for each of the target pages may be determined based on the historical parameter information corresponding to the target pages and weight information corresponding to parameters in the historical parameter information. The search results are ranked according to the weight value for each of the target pages. Here, an occupied weight is set for each of the parameters. For example, a weight for a parameter of the number of clicks by a user is set to be larger, and a weight for the installation time may be set to be less. Each of the parameters is quantified, and then a weight value for each of the target pages is calculated according to the set weights. Search results are ranked according to their weight values. For example, installation time of a source application, the number of clicks on the target page by a user, and dwell time on the target page by the user are selected as calculation parameters. A weight for the installation time is set as 0.2, a weight for the number of clicks on the page by the user is set as 0.5, and a weight for the dwell time on the target page is set as 0.3. Each of the parameters is quantified and multiplied by its corresponding weight, and then is accumulated, and thus a weight value for a target page corresponding to each of the search results is calculated and obtained.

When ranking the search results, a weight value for each of the target pages may also be determined based on historical parameter information corresponding to the target page. That is, the weight value for the page is calculated for each of the parameters. Specifically, when the historical parameter information comprises the installation time of the source applications, the target pages are ranked according to the installation time of the source applications of the target pages to obtain rank information;

the target pages are grouped according to a preset time unit and the installation time, and the weight value for each of the target pages is updated according to the number of groups and the rank information. Here, for example, at the initial stage, weights for pages (Activities) corresponding to each of keywords=1. Pages are ranked chronologically according to the Installation time, and then the pages are grouped according to installation date, for example, the pages are grouped by a day, a week, or a month. 0, 1, 2, 3 . . . or n is added respectively from low to high to the weights for the pages which have been chronologically ranked, wherein n is the number of groups. For example, if the pages are grouped into 4 groups according to the installation date by a week, then the weights of the pages are increased respectively from low to high with a maximum of 4 (that is, +0, +1, +2, +3, +4).

When the historical parameter information comprises information on the number of clicks on the target page by the user, the weight value for each of the target pages is updated according to the information on the number of clicks on the target page by the user. Here, each time a user clicks some search result, a weight value for the corresponding target page is increased by 1. Similarly, when the historical parameter information comprises dwell time on pages, the weight value for the target page may be set to be updated according to a preset length of time and the dwell time on the target page by the user. The dwell time on the target page by the user is counted, for example, in seconds. Each time the user dwells on the target page for 10 seconds, the weight value for the page is increases by 1. A weight value for each of search result pages is calculated according to installation time of applications, the number of clicks on the pages by a user and dwell time on the pages. The pages are comprehensively ranked. When a weight value for a page is higher, a rank for the page is higher, and it is closer to the user's inclination of choice.

In an embodiment of the present application, at step S11, the target application carrying the declaration information may be determined through any one of:

determining at least one target application carrying the declaration information from a list of installed applications of a user equipment;

obtaining, from a network device, a list of applications carrying declaration information, to select, from the list of applications, one or more target applications whose types are the same as those of the applications in the list of installed applications of the user equipment;

obtaining a list of historically installed applications of the user equipment, to determine at least one target application carrying the declaration information from the list of historically installed applications.

Here, a query is made according to a list of installed applications in a system of a user equipment for target applications carrying declaration information. At this time, it can be implemented in the user equipment without the intervention of a server. Eligible applications in the current equipment are obtained. When searching is performed, search results would be page contents from currently installed eligible applications. For example, if a user equipment is installed with application A, application B and application C which have already declared themselves to be searchable, then matching application A, application B and application C are directly obtained from the installed list when searching is performed. The contents information obtained from the applications will no longer be page contents from other applications.

Of course, in addition to the installed applications, when locating target applications carrying declaration information, a list of applications carrying the declaration information may also be obtained from a network device. One or more of the target applications whose type are the same as those of applications in the list of installed applications of the user equipment are selected from the list of applications. Here, information of other apps whose types are the same as those of the currently installed applications may be obtained from the network device. For example, the user equipment is installed with APP1 and APP2, but APP3 of the same type is not installed. If APP3 has declared itself to be searchable, contents related to APP3 may be obtained from the network device. Page information from APP 3 is in turn displayed in a list of search results, which may stimulate the user to install APP 3, and some information related to a page from APP3 can be browsed in the current search engine without jumping to an application interface of APP3, thereby providing the user with more comprehensive search services.

Further, when determining the target applications, a list of historically installed applications of the user equipment may also be obtained. The target applications carrying the declaration information are determined from the list of historically installed applications. Here, by collecting historical records of APP installations of the user equipment, APPs whose page contents are to be collected are selected according to the installation records. For example, the user equipment was historically installed with APP 4. Although it was then deleted, APP 4 may also be used as a target application for obtaining page contents if APP 4 declares itself to be searchable. After a user enters a keyword, search results from APP 4 may be displayed.

In addition, according to another aspect of the present application, it is also provided a computer readable medium having computer readable instructions stored thereon, the computer readable instructions being executable by a processor to implement the above mentioned method for searching for information in applications.

In addition, according to yet another aspect of the application, it is also provided a device for searching for information in applications. The device comprises:

one or more processors; and a memory storing computer readable instructions, wherein the computer readable instructions, when executed, cause the processor to perform the operations of the above mentioned methods.

For example, the computer readable instructions, when executed, cause the one or more processors to:

determine at least one target application carrying declaration information, wherein the declaration information comprises search interface information for searching the target application;

sending a search keyword from a user to the target application via the search interface information for the target application;

receiving search result information determined by the target application according to the search keyword, wherein the search result information comprises the search keyword and page paths of target pages; and generating a search display list according to the search result information.

Obviously, those skilled in the art can make various modifications and variations to the present application without departing the spirit and scope of the present application. In this way, if these modifications and variations of the present application fall within the scope of the claims of the present application and equivalent technologies thereof, the present application is also intended to encompass these modifications and variations.

It should be noted that the present application can be implemented in software and/or a combination of software and hardware, for example, by using an application specific integrated circuit (ASIC), a general purpose computer, or any other similar hardware device. In one embodiment, the software program of the present application can be executed by a processor to implement the steps or functions described above. Likewise, the software programs (including related data structures) of the present application can be stored in a computer readable storage medium such as a RAM memory, a magnetic or optical drive or a floppy disk and the like. In addition, some of the steps or functions of the present application may be implemented in hardware, for example, as a circuit that cooperates with a processor to perform various steps or functions.

In addition, a portion of the present application can be embodied as a computer program product, such as computer program instructions, when executed by a computer, can invoke or provide a method and/or technical solution in accordance with the present application. The program instructions for invoking the method of the present application may be stored in a fixed or removable storage medium, and/or transmitted by a data stream in a broadcast or other signal carrier medium, and/or stored in a working memory of the computer device in which the program instructions run. Herein, an embodiment in accordance with the present application includes an apparatus including a memory for storing computer program instructions and a processor for executing program instructions, wherein when the computer program instructions are executed by the processor, triggering the apparatus to operate the above mentioned methods and/or technical solutions in accordance with various embodiments of the present application.

For those skilled in the art, it is apparent that the present application is not limited to the details of the above-mentioned exemplary embodiments, and the present application can be implemented in other specific forms without departing the spirit or basic features of the present application. Therefore, the present embodiments are to be considered as illustrative and not restrictive. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the apparatus claims may also be implemented by one unit or means by means of software or hardware. The terms first and second and the like are used to represent names and do not represent any particular order.

What is claimed is:

1. A method for searching information in applications, the method comprising:
   determining of at least one target application carrying declaration information, wherein the declaration information comprises search interface information for searching the target application;
   sending a search keyword from a user to the target application via the search interface information for the target application;
   receiving search result information determined by the target application according to the search keyword, wherein the search result information comprises the search keyword and page paths of target pages; and
   ranking the search result information based on historical parameter information corresponding to the target pages to obtain a search display list,
   when the historical parameter information comprises installation time of source applications of the target pages, the method comprising:
   ranking the target pages according to the installation time of the source applications of the target pages so as to obtain rank information; and
   grouping the target pages according to a preset time unit and the installation time, and updating a weight value for each of the target pages according to the number of groups and the rank information.

2. The method according to claim 1, wherein the search display list comprises any combination of one or more of the search keyword, source application information of the target pages, summary information corresponding to the search keyword, and the page paths of the target pages.

3. The method according to claim 1,
   wherein any combination of one or more of the search keyword, source application information, summary information corresponding to the search keyword and a page path of a target page, which correspond to each of the target pages, are sequentially displayed.

4. The method according to claim 1, wherein determining at least one target application carrying the declaration information comprising at least any one of:
   determining at least one target application carrying declaration information from a list of installed applications of a user equipment;
   obtaining, from a network device, a list of applications carrying declaration information, so as to select, from the list of applications, one or more target applications whose types are the same as those of applications in the list of installed applications of the user equipment; and
   obtaining a list of historically installed applications of the user equipment, so as to determine at least one target application carrying the declaration information from the list of historically installed applications.

5. The method according to claim 1, wherein ranking the search result information based on the historical parameter information corresponding to the target pages comprising:
   determining a weight value for each of the target pages based on the historical parameter information corresponding to the target pages and weight information corresponding to parameters in the historical parameter information; and
   ranking the search result information according to the weight value for each of the target pages.

6. The method according to claim 1, wherein ranking the search result information based on the historical parameter information corresponding to the target pages comprising:
   determining a weight value for each of the target pages based on the historical parameter information corresponding to the target pages.

7. The method according to claim 1, wherein when the historical parameter information comprises information on the number of clicks on the target pages by the user, the method further comprising:
   updating the weight values for the target pages according to the information on the number of clicks on the target pages by the user.

8. The method according to claim 1, wherein when the historical parameter information comprises dwell time on the target pages by the user, the method further comprising:

updating the weight values for the target pages according to a preset length of time and the dwell time on the target pages by the user.

9. The method according to claim 3, wherein after the search keyword and the source application information corresponding to each of the target pages from the search result information are sequentially displayed, the method comprising:

jumping to a source application corresponding to a target page according to the user's selection operation and the page path, so as to display page contents information of the target page in the source application.

10. A computer-readable medium having computer-readable instructions stored thereon, the computer-readable instructions being executable by a processor to implement the method as recited in claim 1.

11. A device for searching for information in applications, the device comprising:

one or more processors; and a memory storing computer readable instructions, wherein the computer readable instructions, when executed, cause the processor to perform operations of the method as recited in claim 1.

\* \* \* \* \*